US009750240B2

(12) United States Patent
Parsons

(10) Patent No.: US 9,750,240 B2
(45) Date of Patent: Sep. 5, 2017

(54) PORTABLE LAY-DOWN BLIND INCLUDING GURNEY-STYLE SEAT

(71) Applicant: Timothy Parsons, Napa, CA (US)

(72) Inventor: Timothy Parsons, Napa, CA (US)

( * ) Notice: Subject to any disclaimer, the term of this patent is extended or adjusted under 35 U.S.C. 154(b) by 0 days.

(21) Appl. No.: 14/834,340

(22) Filed: Aug. 24, 2015

(65) Prior Publication Data

US 2016/0050907 A1  Feb. 25, 2016

Related U.S. Application Data

(60) Provisional application No. 62/040,812, filed on Aug. 22, 2014.

(51) Int. Cl.
| | | |
|---|---|---|
| *A01M 31/02* | (2006.01) | |
| *E04H 15/00* | (2006.01) | |
| *E04H 15/34* | (2006.01) | |
| *A47C 1/14* | (2006.01) | |
| *A47C 7/62* | (2006.01) | |
| *A47C 4/42* | (2006.01) | |

(52) U.S. Cl.
CPC ............ *A01M 31/025* (2013.01); *A47C 1/14* (2013.01); *A47C 4/42* (2013.01); *A47C 7/62* (2013.01); *E04H 15/001* (2013.01); *E04H 15/34* (2013.01)

(58) Field of Classification Search
CPC ..... A01M 31/025; E04H 15/001; A47C 1/143
USPC .............. 135/143, 901; 43/1; 297/452.13
See application file for complete search history.

(56) References Cited

U.S. PATENT DOCUMENTS

| | | | | |
|---|---|---|---|---|
| 2,209,145 A | * | 7/1940 | Weber | A47C 5/06 297/1 |
| 2,495,482 A | * | 1/1950 | Rogatz | A47D 15/006 128/876 |
| 2,816,297 A | | 11/1955 | Stanley | |
| 2,836,833 A | * | 6/1958 | Carlson | A47K 3/127 297/452.56 |
| 2,930,430 A | * | 3/1960 | Bloom | A47C 3/029 297/271.6 |
| 2,959,796 A | * | 11/1960 | De Sander | A63B 35/06 441/131 |
| 3,509,891 A | * | 5/1970 | De Bolt | A01K 97/01 135/148 |
| 3,638,257 A | | 2/1972 | Ernst | |
| 3,799,608 A | * | 3/1974 | Smutny | E04H 1/1205 135/115 |
| 3,933,164 A | * | 1/1976 | Ness | A45F 4/06 135/128 |
| 4,049,314 A | * | 9/1977 | McGaffin | A47C 4/02 297/130 |

(Continued)

*Primary Examiner* — Noah Chandler Hawk
(74) *Attorney, Agent, or Firm* — Brian Beverly; Beeson Skinner Beverly, LLP

(57) ABSTRACT

A portable lay-down blind including a gurney-style seat comprises a framework supporting a covering which forms an enclosure sized for accommodating an occupant, the covering having a top opening providing access to the enclosure, the framework including a seat frame having lateral support arms extending from the head end to the toe end of the framework, the gurney-style seat suspended from the lateral support arms and capable of supporting the weight of the occupant in a position elevated above a support surface; one embodiment the seat frame including a transversely extending bottom brace for reinforcing the lateral support arms.

19 Claims, 11 Drawing Sheets

(56) References Cited

U.S. PATENT DOCUMENTS

| | | | |
|---|---|---|---|
| 4,295,683 A * | 10/1981 | Dubbink | A47K 3/127 |
| | | | 297/377 |
| 4,338,691 A * | 7/1982 | Gaffney | A61G 7/1003 |
| | | | 296/20 |
| 4,842,335 A * | 6/1989 | Wunderlich | A47C 1/143 |
| | | | 297/344.21 |
| 4,914,768 A * | 4/1990 | Howard | A47C 29/006 |
| | | | 5/113 |
| 5,240,021 A * | 8/1993 | Snodgrass | E04H 15/425 |
| | | | 135/116 |
| 5,449,014 A * | 9/1995 | Yan-ho | A47C 29/003 |
| | | | 135/156 |
| D379,961 S | 6/1997 | Cripe | |
| 5,647,159 A | 7/1997 | Latschaw | |
| D405,890 S | 2/1999 | Latschaw | |
| 5,903,997 A * | 5/1999 | Jacob | A01M 31/025 |
| | | | 135/901 |
| 5,941,264 A | 8/1999 | Gregg | |
| 6,192,909 B1 * | 2/2001 | Strausser | E04H 15/40 |
| | | | 135/116 |
| 6,668,749 B2 | 12/2003 | Fargason | |
| 6,694,995 B1 | 2/2004 | Ransom | |
| 6,698,131 B2 | 3/2004 | Latschaw | |
| 6,938,632 B2 | 9/2005 | Coursey | |
| 7,237,283 B2 | 7/2007 | Devries | |
| D572,371 S | 7/2008 | Desouche et al. | |
| 7,549,434 B2 * | 6/2009 | Bean | E04H 15/001 |
| | | | 135/143 |
| 7,997,291 B2 * | 8/2011 | Gressette, III | A01M 31/02 |
| | | | 135/117 |
| 8,381,750 B2 | 2/2013 | Desouches et al. | |
| 2004/0231221 A1 | 11/2004 | Latschaw | |

* cited by examiner

PORTABLE LAY-DOWN BLIND INCLUDING GURNEY-STYLE SEAT

CROSS-REFERENCE TO RELATED APPLICATIONS

This application claims the benefit of U.S. Provisional Application No. 62/040,812 file Aug. 22, 2014.

BACKGROUND

Field of the Invention

This invention relates generally to portable lay-down blinds used for disguising an occupant from wildlife, and particularly to a portable lay-down blind having an elevated body-cradling gurney-style seat suspended from lateral support arms.

Description of the Related Art

Portable blinds are widely used by sports and wildlife enthusiasts. Camouflaged lay-down hunting blinds of the type indicated by numeral 2 in FIG. 1 have come into widespread use by waterfowl hunters and are increasingly popular with wildlife photographers. A lay-down blind is readily portable and easy to set up in a relatively flat location. As deployed in the field, a lay-down blind has an elongated configuration forming an enclosure 4. A hammock-style seat for an occupant, longitudinally suspended between head end and toe end frame members, is provided within the enclosure in which an occupant 6 can assume a nearly horizontal recumbent position. The head end of the seat is suspended from an elevated transversely extending head end crossbar, and the toe end of the seat is attached to a ground level toe end crossbar by straps which, when tightened, suspend at least a portion of the seat above ground level. A pair of cooperating longitudinal flap doors 8 covers a top opening that affords access to the interior of the blind. While in the blind with its doors closed, an occupant is effectively concealed from view. When an object of interest approaches, the occupant can in one motion throw open the blind doors with his or her upper body and quickly sit up to take immediate action.

There are several drawbacks to traditional lay-down blinds including that it can become uncomfortable to lie in the nearly horizontal posture for extended periods of time as required by the design of such blinds. Another problem is that over time a person sitting in the longitudinally-suspended hammock-style seat typical of a lay-down blind may tend to slide downward on the seat and toward the toe end of the blind, requiring repeated repositioning. In addition, it is difficult for some individuals to abruptly rise from the nearly horizontal lying position mandated by a lay-down blind to a position sufficiently upright to take such action as discharging a firearm or taking a picture.

Another disadvantage to lay-down blinds is that they may not support the weight of larger sized individuals. A large person may wish to push down on the sides of the enclosure when moving from a lying to a sitting position, as when arising from a chair. Traditional lay-down blinds, however, have fabric side panels which are structurally ill-equipped to support the weight of even an average-sized adult. Moreover, excess weight bearing on the side panels can damage a conventional lay-down blind.

An additional problem is that, although the seat in a lay-down blind is frequently constructed from forgiving foam, a significant portion of the seat still lies directly on the floor of the blind and the immediately underlying ground surface, which can be cold and uncomfortable.

Accordingly, there is a need for a portable blind having a seat that permits the occupant to rest in a more comfortable position for an extended period of time, that is capable of holding larger-sized occupants, and that provides robust support for an individual during movement from a reclining position to an upright position.

DETAILED DESCRIPTION OF THE ILLUSTRATED EMBODIMENT

Figure 1:
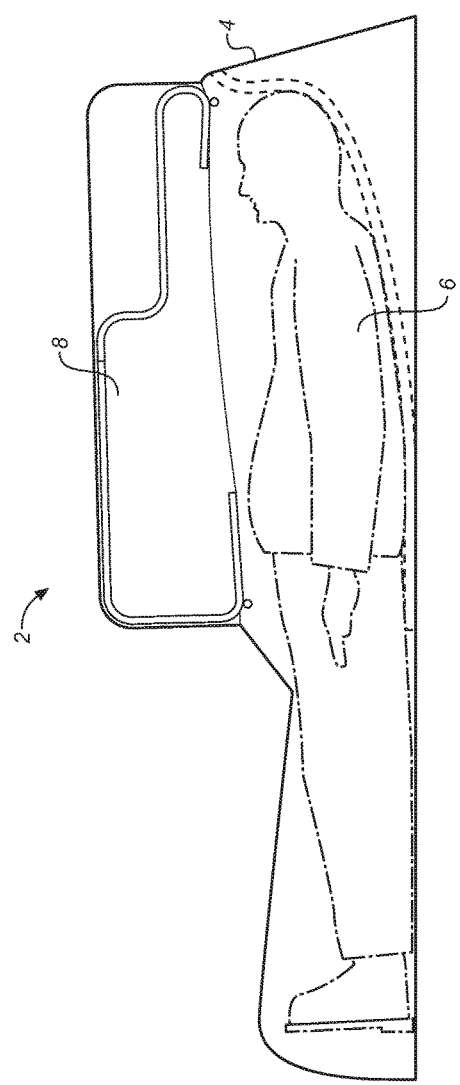
FIG. 1 is a side elevation view of a prior art lay-down blind.
Figure 2A:
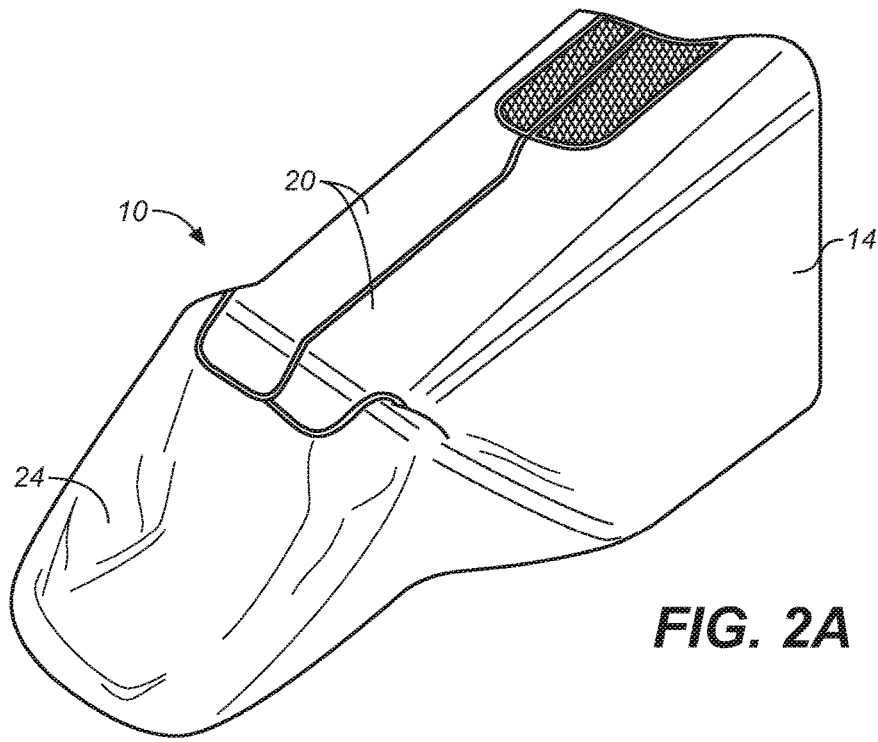
FIGS. 2A and 2B are upper perspective views of a portable camouflage blind including a gurney-style seat suspended from lateral support arms according to the invention, showing top access doors in closed and open positions, respectively.
Figure 2B:
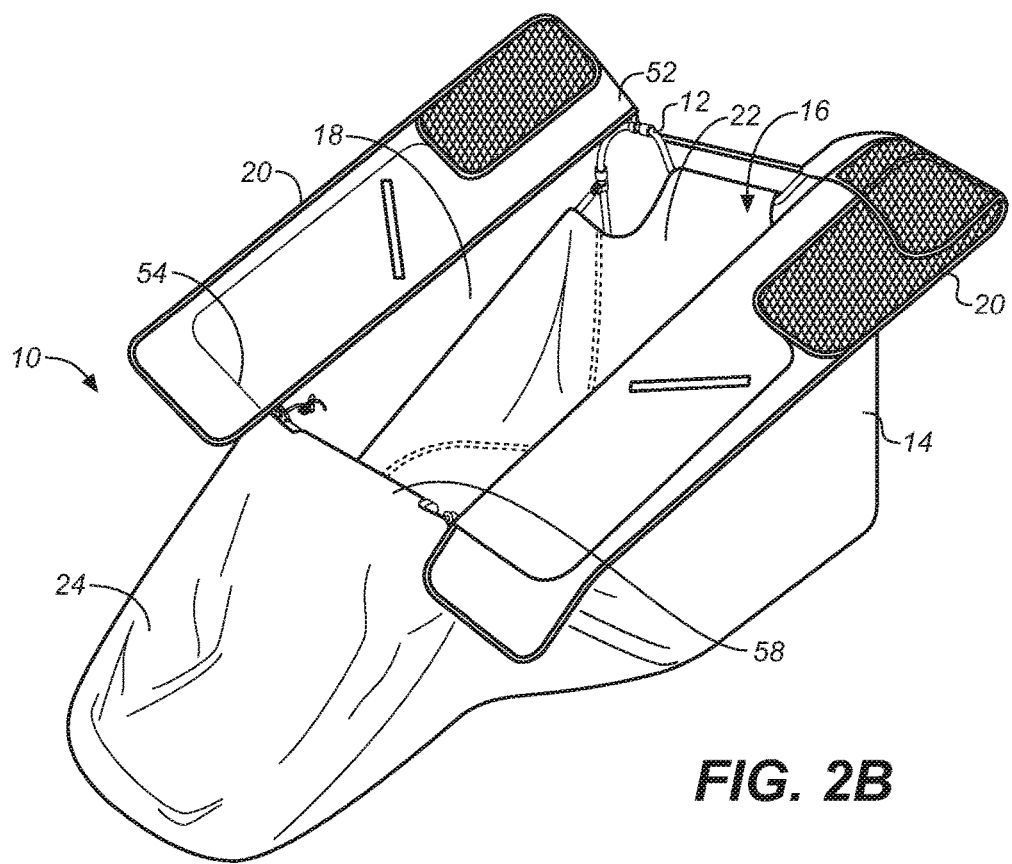

A portable lay-down blind including a body-supporting hammock suspended from lateral supports according to the invention is indicated generally at numeral 10 in FIGS. 2A and 2B. It includes, similar to a lay-down blind, an internal framework 12 and a fabric covering 14 supported by the framework 12 which thereby forms an enclosure 16. Access to the enclosure 16 is provided through a top opening 18 covered by a pair of flap doors 20. A laterally-supported gurney-style seat 22 for cradling an occupant is suspended from the framework 12, and a toe box 24 accommodates the occupant's lower extremities and miscellaneous supplies and gear.

Figure 3A:
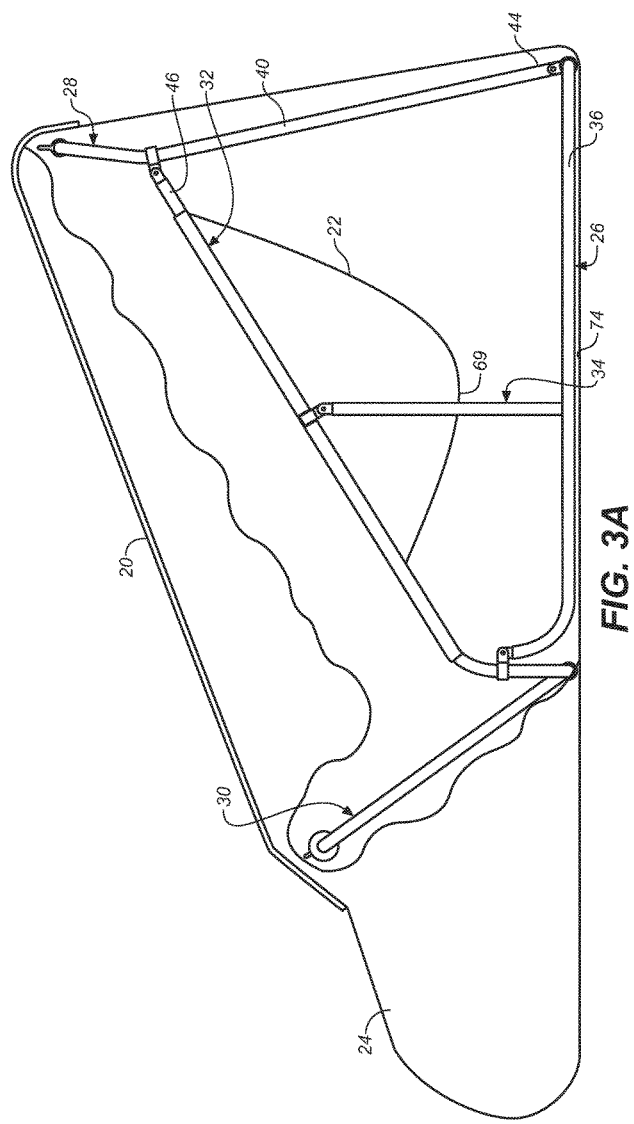
FIGS. 3A and 3B are side perspective views of the blind shown in FIGS. 2A and 2B, with the doors shown in closed and open positions, respectively, wherein portions of the blind cover have been cut away to show the framework of the blind.
Figure 3B:
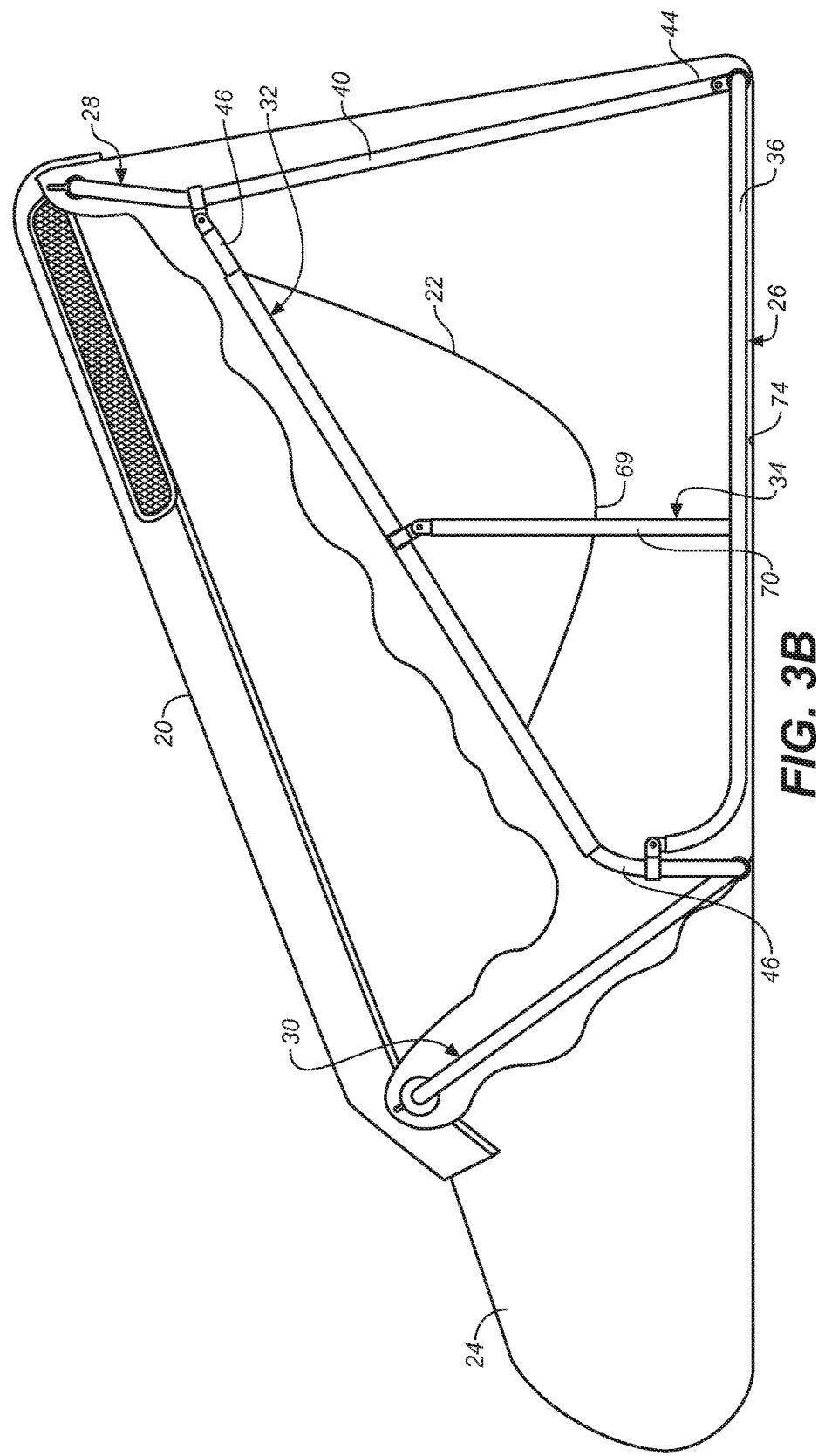
Figure 4:
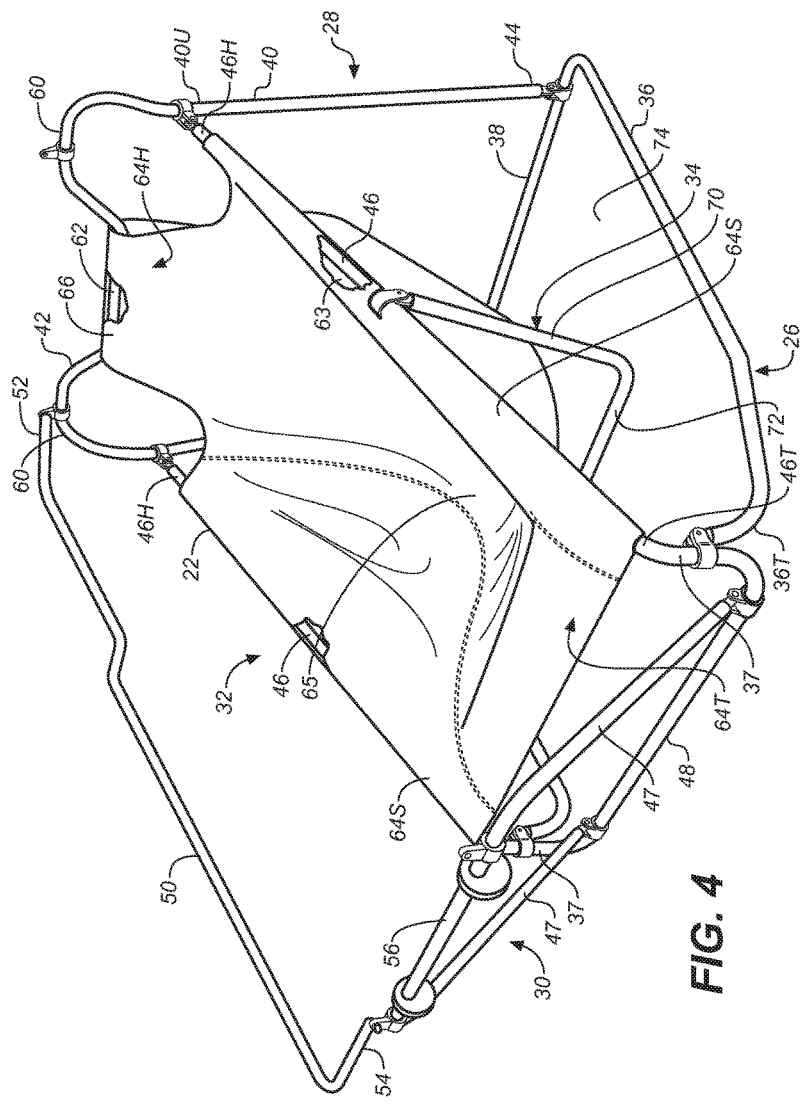
FIG. 4 is an upper perspective view of the framework, seat, and one flap door frame of the blind.

With reference now to FIGS. 3A, 3B, and 4, it is seen that the framework comprises a base frame 26, a head-end frame 28, a toe-end frame 30, a seat frame 32, and an optional bottom brace 34. Frame members are constructed of tubular aluminum bar stock, but in alternate embodiments may comprise any other metal, plastic or other material in any shape that is suitably strong, compact and lightweight. The U-shaped base frame 26 comprises two horizontal side bars 36 interconnected by a horizontal crossbar 38. The head frame 28 includes two vertical struts 40 interconnected by a horizontal top bar 42. The bottom ends 44 of the struts 40 are pivotally connected to opposite ends of crossbar 38 as shown in FIG. 4.

The seat frame 32 comprises two lateral support arms 46 and a horizontal lower cross piece 48 connected to the toe ends 46T of support arms 46 via a pair of vertical risers. While the illustrated embodiments show lateral support arms 46 integrally connected to risers 37, in other embodiments support arms 46 may be mechanically connected to risers 37, such as by using a hinged connector. The upper or head ends 46H of support arms 46 are detachably connected to the upper ends 40U of vertical struts 40, and the toe ends 46T of support arms 46 are detachably connected to the toe ends of horizontal side bars 36, thereby forming a self-supporting frame structure. The side bars 47 of the U-shaped toe-end frame 30 are pivotally connected to opposite ends of cross piece 48 so that toe-end frame 30 extends upwardly from and in pivoting relation to cross piece 48 to support toe box 24 as can be seen in FIG. 5.

Seat 22 is suspended between laterally-disposed support arms 46. Support arms 46 are inserted in side sleeves 63 in the side edges 64S of seat 22 such that robust, gurney-style lateral support is provided along substantially the entire longitudinal length of seat 22. In the illustrated embodiment, the center portion 65 of seat 22 is recessed, thereby forming a comfortable body-cradling bucket-style seat in which center portion 65 is disposed below the head end edge 64H and below the toe end edge 64T thereof, so that an occupant can rest for extended periods of time without sliding downward or having to reposition. Although FIG. 5 shows the occupant O in a partially reclined posture, the invention is not limited to any precise posture or position of the occupant, and it will be recognized by those of skill in the art that seat 22 could be suspended from support arms 46 at a variety of inclinations and that the depth of the center portion 65 below the lateral support arms 46, and the head end and toe end edges 64H, 64T may vary to contour the seat 22 to correspond to the posture, size and preference of the occupant.

Additional rigid support may optionally be provided along the head and toe ends 64H, 64T of the seat 22. Thus, in the illustrated embodiment wherein the top bar 42 of head-end frame 28 comprises two shoulders 60 interconnected by segment 62, the upper sleeve 66 of seat 22 is wrapped around and secured to segment 62. The toe end 64T of seat 22 is stretched between support arms 46 providing strong yet flexible support for an occupant's legs across the seat's toe end as seen in FIG. 5. Those of skill in the art will understand that, while the illustrated embodiment shows the head end 64H of the seat being supported by upper sleeve 66 being wrapped around connecting segment 62 of head-end frame 28, in alternate embodiments the head end of seat 22 could be supported by being wrapped around a transversely extending support bar (not illustrated), or the head end could merely be stretched between lateral support members, such as support arms 46. Similarly, the toe end of seat 22 could be supported by a crossbar (not illustrated) extending between the toe ends 46T of support arms 46.

Figure 5:
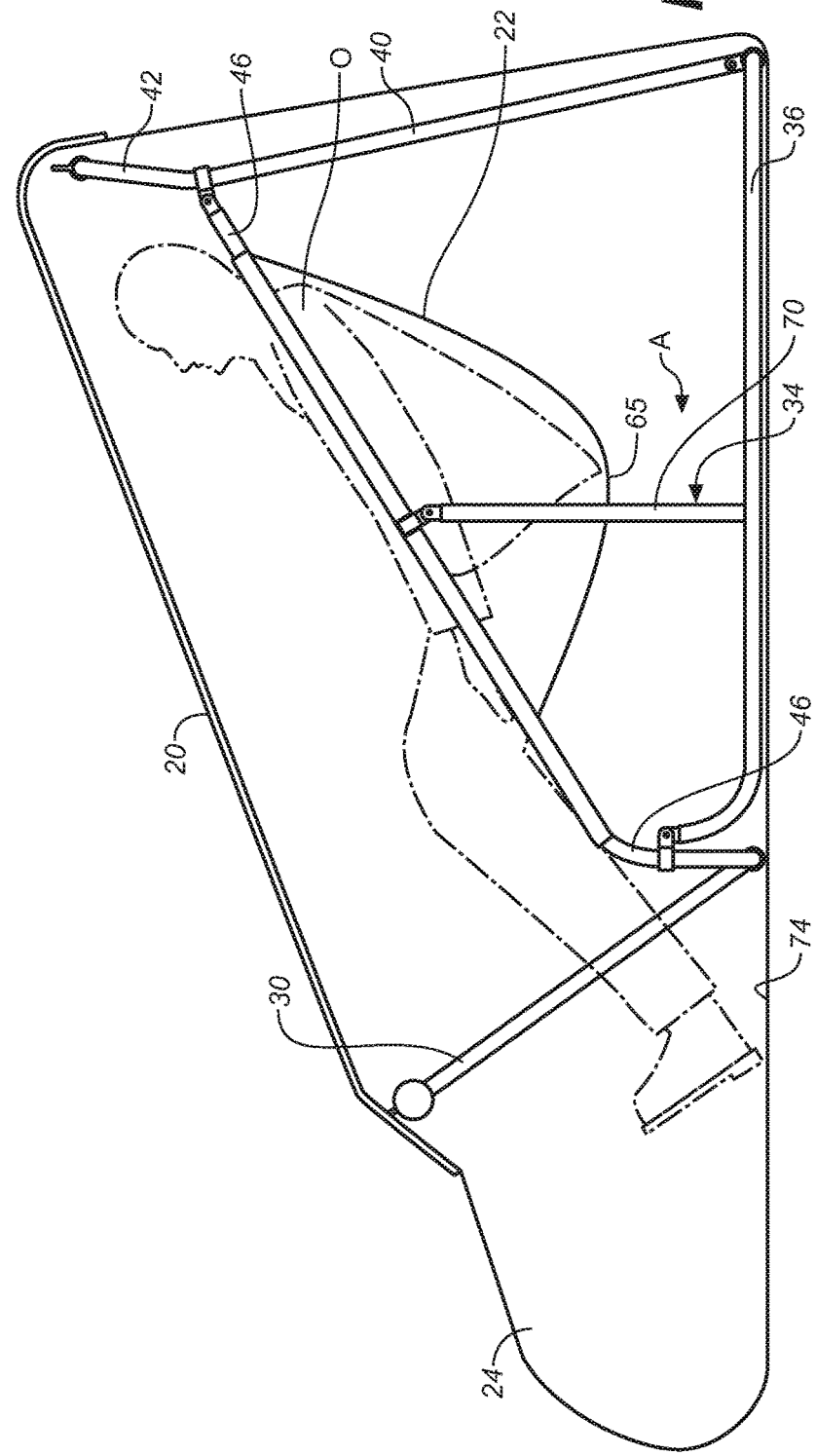
FIG. 5 is a side perspective view of the blind cover cut away to reveal the gurney-style seat and interior framework, showing an occupant disposed in the seat in a partially-reclined position.

As seen in FIG. 5, the lowest part of the seat 22, center portion 65, is spaced upwardly from the floor panel 74 of the blind, thereby elevating an occupant O above a ground surface on which the blind is deployed and advantageously creating an insulating air gap A between the occupant O and the floor panel 74 and underlying ground surface. A further advantage to this arrangement is that insulating foam commonly included in the seat of a typical lay-down blind can be eliminated from the seat, thereby decreasing manufacturing costs.

The bottom brace 34 is connected to support arms 46 as shown in FIGS. 3A, 3B, 4 and 5. It will be appreciated by those of skill in the art that bottom brace 34 is optional and that seat 22 can be suspended from support arms 46 without support brace 34 being in place. Brace 34 comprises inwardly inclined vertical side bars 70 interconnected by horizontal bottom bar 72. The upper ends of each of the side bars 70 are pivotally connected to support arms 46 so that support brace 34 naturally orients itself vertically as it hangs freely from support arms 46. Side bars 70 are sized so that bottom bar 72 lies just above the floor panel 74 of the blind. This arrangement has the dual advantages that the support brace 34 can be swivelled into planar alignment with the support arms 46 of the seat frame 32 when desired to facilitate collapsing the framework 12, and that slight downward pressure on support arms 46, as when an occupant pushes down on them when arising from the seat, engages the bottom bar 72 with the ground surface, thereby reinforcing support arms 46 against excess bending or collapse.

Each flap door 20 (see FIGS. 2A-3B) is supported by the door frame 50 shown in FIG. 4. After the blind cover 14 is pulled up around framework 12 (as shown in FIG. 2B), one end 52 of each door frame 50 is connected to top bar 42, and the other end 54 is connected to cross member 56 of toe-end frame 30, thereby holding toe-end frame 30 in rigid relation to base, head-end and seat frame members 26, 28, and 32. A portion 58 (see again FIG. 2B) of the cover 14 is wrapped around and secured to cross member 56, e.g., by hook-and-loop fasteners (not illustrated).

Each of the connections between base, head-end, toe-end, seat and bottom brace framework members 26, 28, 30, 32 and 34 is made using durable, highly wear-resistant nylon fittings known in the art which quickly and easily form detachable connections that permit rapid assembly and breakdown of the framework members. It will be understood, however, that the fittings could be comprised of metal or a variety of plastics.

Figure 6:
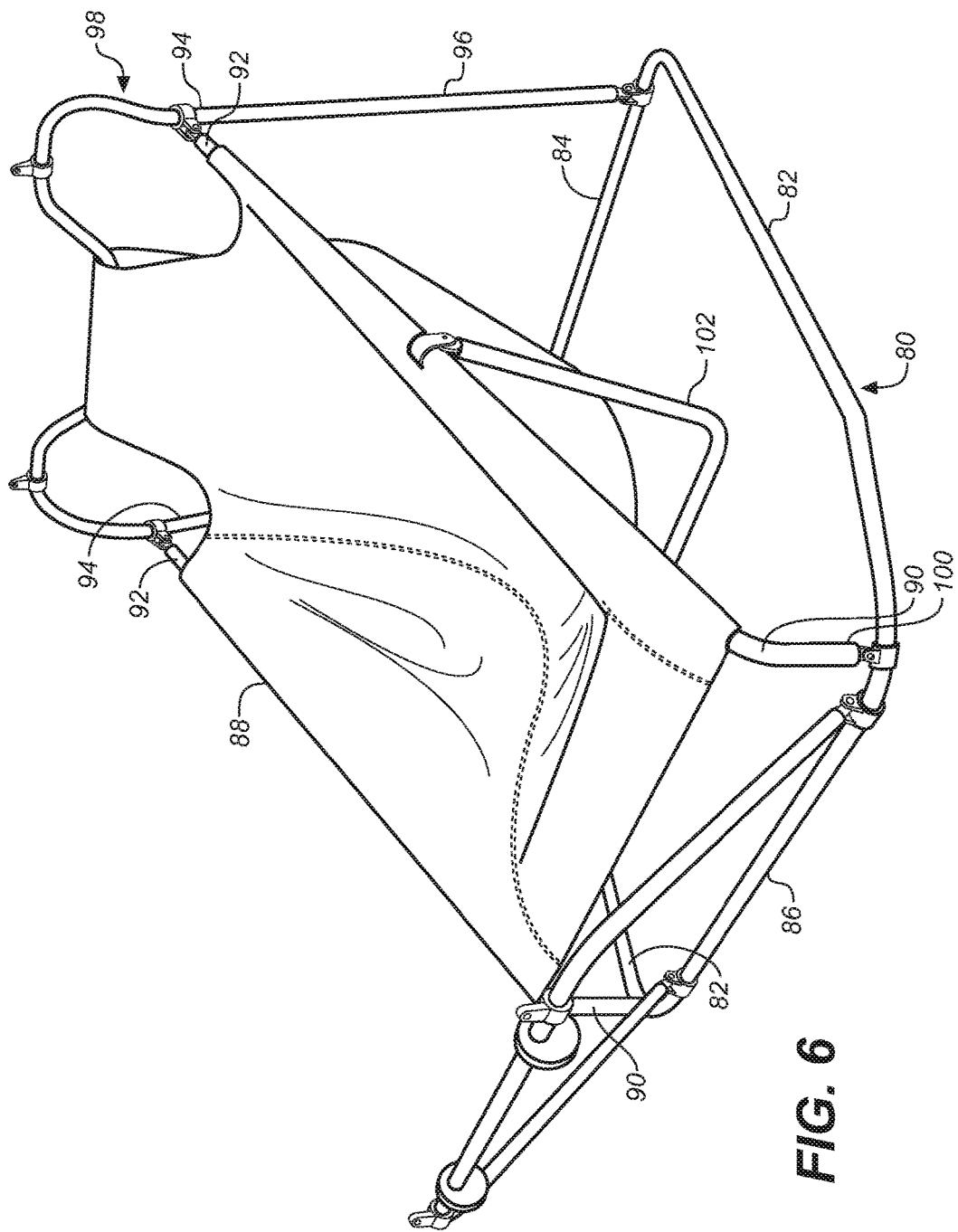
FIG. 6 is an upper perspective view of the framework and seat of a blind similar to FIG. 4, but showing an alternate embodiment of the framework.

An alternate embodiment of the framework 12 to that shown in FIGS. 3A-5 is seen in FIG. 6. In all respects the construction is the same, except that instead of a cross piece 48 interconnecting the toe ends 46T of support arms 46 as shown in the embodiment of FIG. 4, the corresponding structure is integrated into base frame 80 as shown in FIG. 6. Accordingly, base frame 80 comprises integrated side bars 82, head-end crossbar 84 and toe-end crossbar 86. Side support for seat 88 is provided by separate lateral support arms 90, the upper ends 92 of which are connected to the upper ends 94 of vertical struts 96 of head-end frame 98, and the lower ends 100 of which are connected to opposite ends of toe-end crossbar 86. The lateral support arms 90 are interconnected and supported by bottom brace 102 in the same manner as discussed above in connection with the embodiment shown in FIG. 4.

Figure 7:
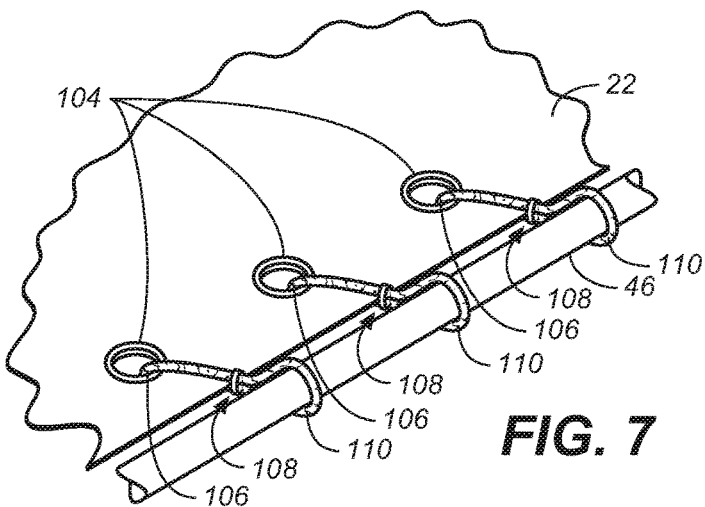
FIG. 7 is an upper perspective view of a portion of an alternate embodiment of a portable camouflage blind showing one mode of attaching the seat to the framework.

With reference now to FIGS. 7-13, alternative modes are described for connecting the seat 22 to the lateral support arms 46, as compared to the embodiments shown in FIGS. 2B-6. In FIG. 7, it is seen that an array of eyelets 104 is provided along the edge of the seat 22. One end 106 of a loop fastener 108 passes through each of the eyelets 104 and is secured to the seat edge via a knot, clip or other means. A loop end 110 of each fastener encircles support arm 46. The array of loop fasteners 108 thus secures the seat 22 to support arms 46. The fasteners 108 may be elastic or non-elastic cord material.

Figure 8:
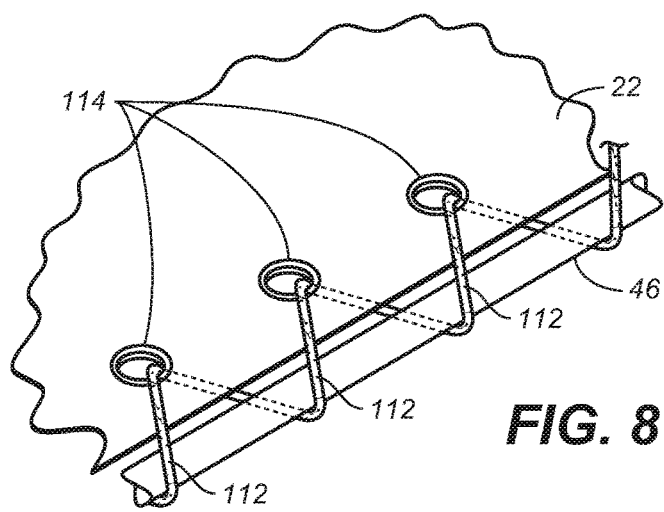
FIG. 8 is an upper perspective view of a portion of the another embodiment of a portable camouflage blind showing an alternate mode of attaching the seat to a framework.

In FIG. 8, a cord 112 is laced through a series of eyelets 114 in the edge of the seat 22 and around the support arm 46, thus securing the seat to the support arm. The cord 112 may be an elastic bungee-type cord to allow the seat 22 to stretch to accommodate an occupant thereof, or it may be a non-elastic line or rope. The eyelets 114 may be reinforced with a grommet or other durable edge liner.

Figure 9:
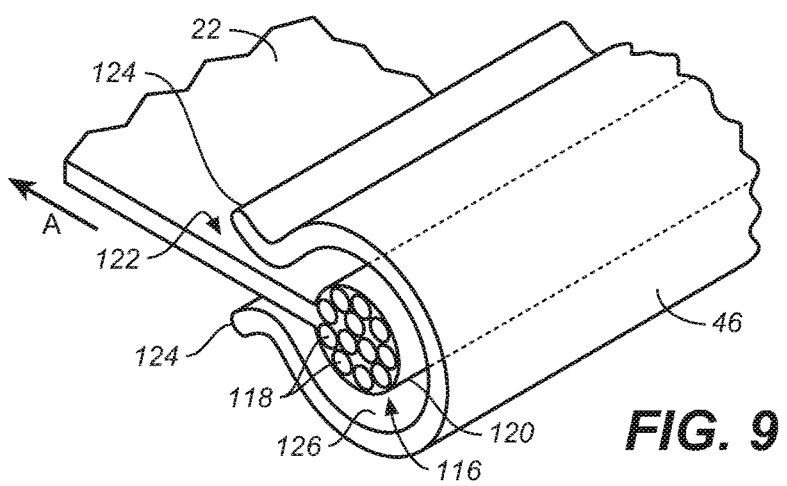
FIG. 9 is an upper perspective view of a portion of a third embodiment of a portable camouflage blind showing a third mode of attaching the seat to the framework.

FIG. 9 shows a linear bead and sleeve fastener. A linear bead 116 is incorporated into the edge of seat 22 by securing one or more lines 118 in a cylindrical enclosure 120. Support arms 46 are provided with a linear opening 122 formed between opposing jaws 124 which communicates with the interior 126 thereof. The seat 22 is secured to support arms 46 by feeding bead 116 longitudinally into the interior 126 of each support arm 46. Support arm 46 is comprised of material sufficiently rigid that jaws 124 will not expand thereby retaining bead 116 in support arm 46 when seat 22 is pulled perpendicularly thereto as indicated by arrow A.

Figure 10:
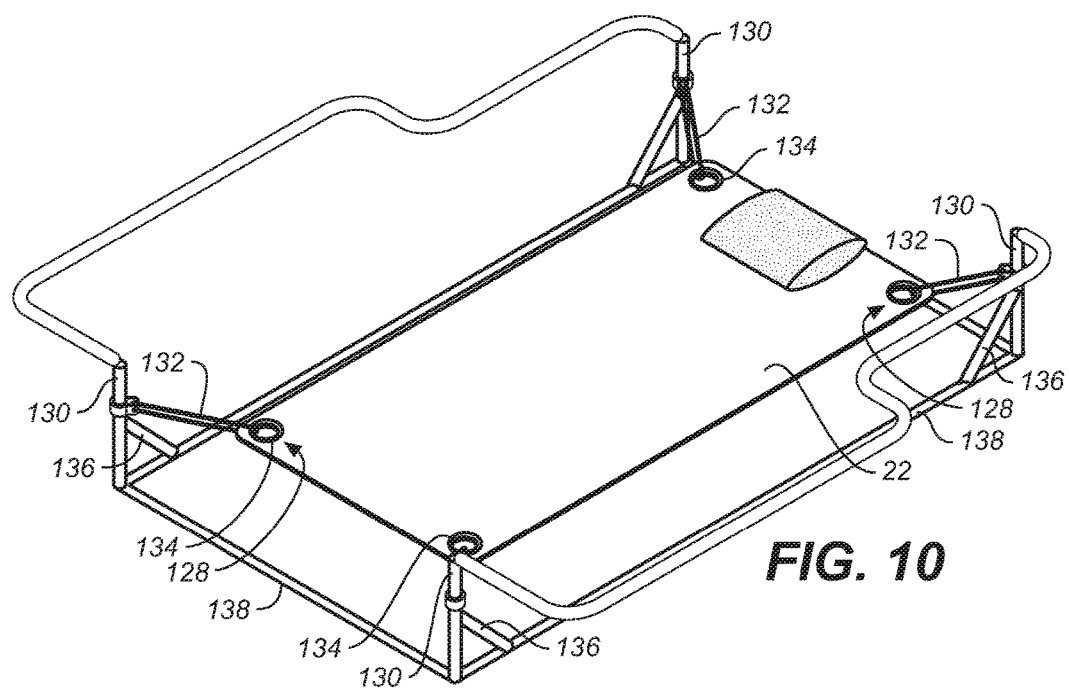
FIG. 10 is an upper perspective view of a portion of a fourth embodiment of a portable camouflage blind showing a fourth mode of attaching the seat to the framework.

FIG. 10 depicts an embodiment in which the seat 22 is suspended by its corners 128 from corner support stakes 130. One end of a tie 132 is secured to each corner 128 of the seat through eyelet 134. The other end is secured to a corner support stake 130. Each of the corner support stakes 130 may have reinforcing angled brackets 136 extending from the stake 130 to a bottom longitudinal or lateral frame member 138. A head pillow 140 may be provided instead of the headrest, which could be wrapped around the top bar of the head-end frame member in the embodiments shown in FIGS. 2A-6.

Figure 11:
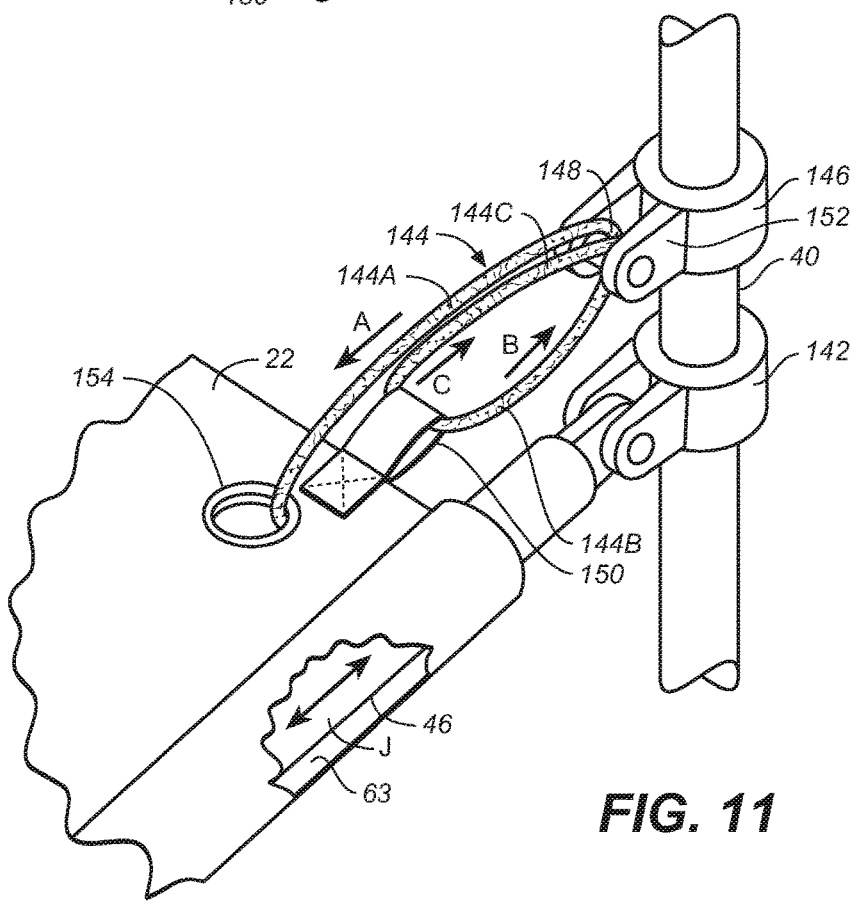
FIG. 11 is an upper perspective view of a portion of a fifth embodiment of a portable camouflage blind showing a tension adjusting mechanism.
Figure 12:
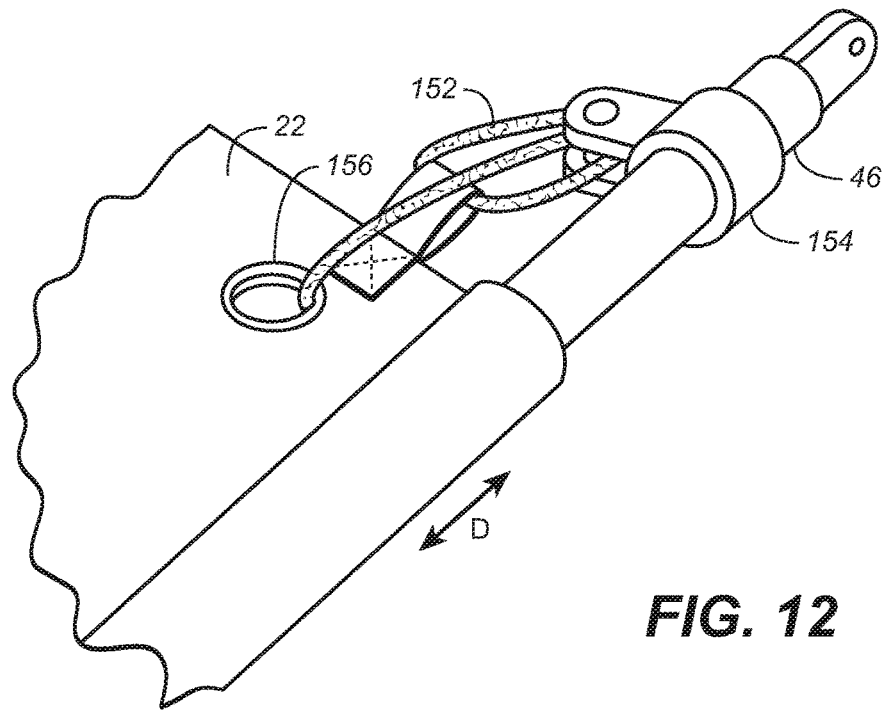
FIG. 12 is an upper perspective view of a portion of a six embodiment of a portable camouflage blind showing an alternate tension adjusting mechanism.
Figure 13:
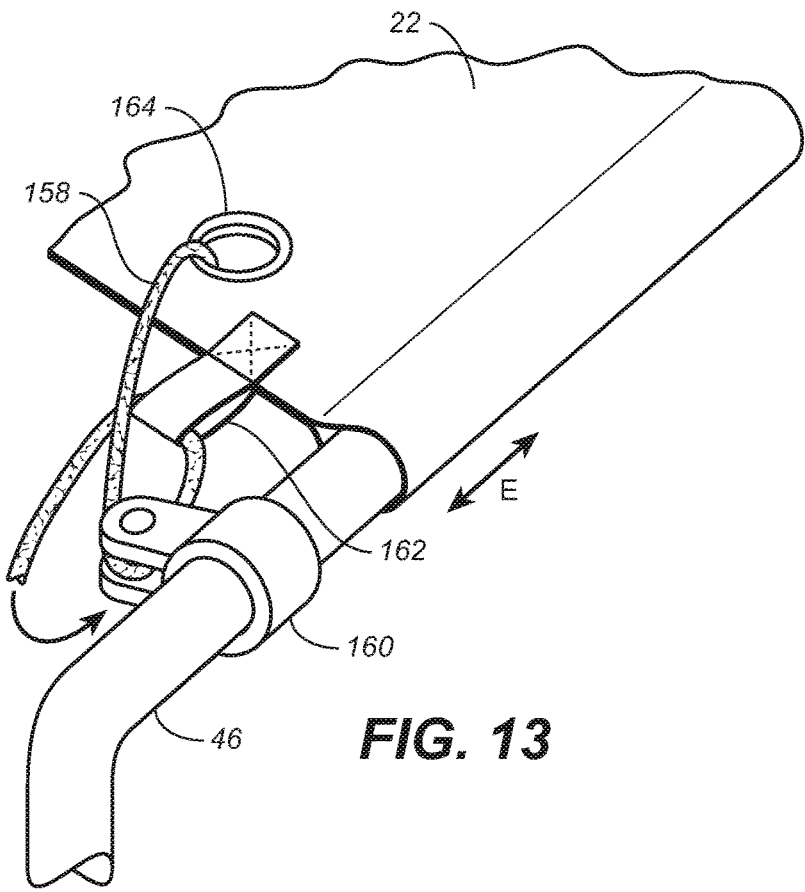
FIG. 13 is an upper perspective view of a portion of a seventh embodiment of a portable camouflage blind showing a third tension adjusting mechanism.

With reference now to FIGS. 11-13, alternate tension adjustment mechanisms are described. In FIG. 11 it is seen that support arm 46 is slidably disposed in the side pocket 63 of seat 22. Support arm 46 is attached to vertical strut 40 via fitting 142. One end of tie 144 is connected to anchor 146 between anchor arms 152 at numeral 148. Tie 144 is laced through webbing 150 which is secured to the longitudinal edge of seat 22. Tie 144 loops back from webbing 150 through anchor arms 152, and back again through eyelet 154 in seat 22 forming a pulley arrangement. Pulling length 144A of tie 144 in the direction indicated by arrow A pulls length 144B in the direction indicated by arrow B, shortening the loop created by lengths 144B and 144C and moving webbing 150 in the direction indicated by arrow C, thereby tightening seat 22 to strut 40.

In the tightening mechanism shown in FIG. 12, tie 152 is secured to fitting 154 but loops back and forth between fitting 154 and eyelet 156, and fitting 154 is attached to lateral support arm 46 instead of one of the vertical struts as seen in FIG. 11.

FIG. 13 shows a tightening mechanism wherein one end of tie 158 is secured to fitting 160 and loops back and forth between fitting 160 and a webbing 162 which is attached to the edge of seat 22. Pulling on the other end of tie 158 through eyelet 164 from the underside of seat 22 thus tightens seat 22 toward fitting 160. Fitting 160 is attached to lateral support arm 46 in a similar arrangement to that shown in FIG. 12.

It will be understood by those of skill in the art that the ties 144, 152 and 158 shown in the embodiments illustrated in FIGS. 11-13 could be comprised of non-elastic cord or rope, or flexible material such as bungee cords. It will also be seen that the tightening mechanisms discussed above can be used not only to tighten or loosen the attachment of the seat to the support frame, but also to move the seat forward or aft along lateral support arms 46 to accommodate various sized individuals as indicated by arrows D in FIG. 12, E in FIG. 13, and J in FIG. 11.

Figure 14:
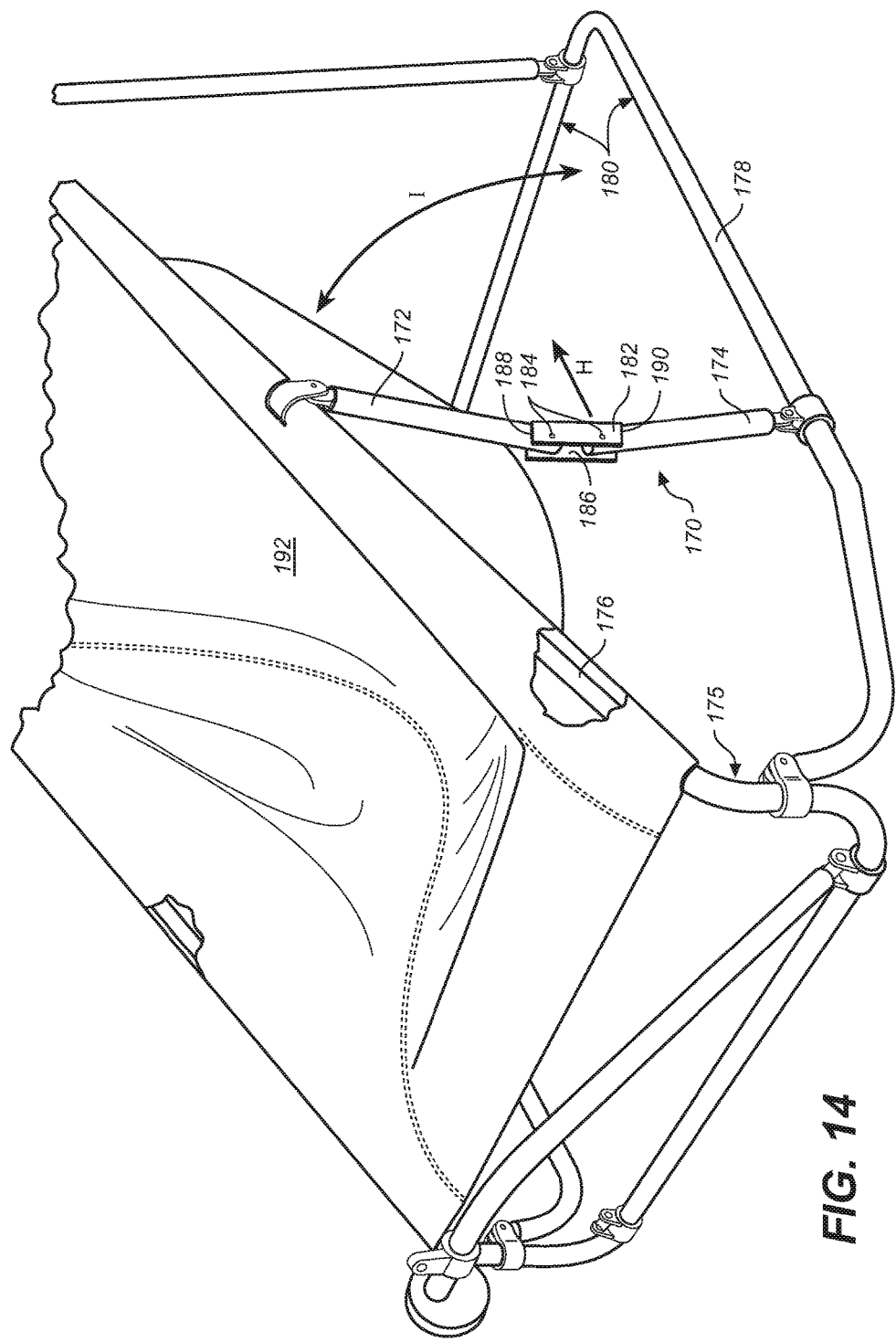
FIG. 14 is an upper perspective view of a portion of an eighth embodiment of a portable camouflage blind showing a folding side brace.

In the embodiment shown in FIG. 14, a folding side brace 170 is provided as an alternative to the suspended pivoting bottom brace 34 seen in the embodiment illustrated in FIG. 4. The top leg 172 and bottom leg 174 of side brace 170 are attached in pivoting relation to the lateral support arm 176 of the seat frame 175 and the side bar 178 of the base frame 180, respectively. A locking sleeve 182 is attached to adjacent ends of the top and bottom legs 172, 174 about pivot pins 184. Sleeve 182 includes opening 186 on one side such that legs 172, 174 can be folded over onto each other in a collapsed configuration by moving locking sleeve 182 in the direction indicated by arrow H, or deployed in a seat-supporting extended configuration as shown in FIG. 14. Legs 172, 174 are prevented from bending more than slightly beyond 180° by engagement with the top and bottom edges 188, 190 of brace 170 as shown. Those of skill in the art will readily understand that greater downward pressure bearing on the folding side brace 170 when in its extending configuration, as by an individual occupying the seat 192, will more securely lock the folding side brace 170 in the slightly over-extended configuration shown in FIG. 14.

Folding side brace 170 could be incorporated in a blind such as the embodiment illustrated in FIG. 4, in which case the side brace would collapse when the seat and base frame members 176, 180 are disengaged and collapse upon each other as indicated by double arrow I. Alternatively, folding side brace 170 could be incorporated in a blind provided with similar foldable side supports such that the blind could be collapsed by folding all of the side supports simultaneously.

A portable camouflage blind including a seat suspended from lateral supports according to the invention provides a comfortable body cradling seat suspended between lateral support members. The seat allows an occupant to settle into a comfortable partially reclined position within the enclosure of the blind. A bottom brace augments support for an occupant of the seat. The support afforded by the lateral support arms and bottom brace accommodates any occupant who wishes to make use of side supports when arising from the seat and provides a robust structure suitable for larger sized individuals.

There have thus been described and illustrated certain embodiments of a portable laydown blind including a gurney-style seat according to the invention. Although the present invention has been described and illustrated in detail, it should be clearly understood that the disclosure is illustrative only and is not to be taken as limiting, the spirit and scope of the invention being limited only by the terms of the appended claims and their legal equivalents.

I claim:

1. A portable lay-down blind including a gurney-style seat comprising:
   a framework, a covering supported by said framework, said covering forming an enclosure sized for accommodating an occupant, said covering having a top opening providing access to the enclosure, said framework having a head end frame, an elevated seat frame, and a head end base bar for resting on a support surface, said head end frame having two vertical struts extending upwardly from the head end base bar, each strut having a top end, said seat frame having a pair of vertical risers, a toe end crossbar extending therebetween for resting on a support surface, and a pair of elevated lateral support arms each having a support arm head end and a support arm toe end, the support arm head ends attached to the top ends of the vertical struts of said head end frame, the support arm toe ends attached to said vertical risers, a ground surface plane coterminous with the head end base bar and the toe end cross bar, the support arm head ends and the support arm toe ends spaced from the ground surface plane, the support arm head ends spaced from the ground surface plane more than the support arm toe ends, a seat frame plane coterminous with the head ends and toe ends of said lateral support arms, and a gurney-style seat configured to support an occupant in a reclining disposition in an elevated position in said enclosure above the support surface and sized to provide support surfaces for the torso and legs of such occupant, the seat having side edges, a head end edge, a toe end edge, and a center portion between said head end, toe end and side edges, the seat suspended by said side edges from the lateral support arms of said seat frame, the seat also configured so that the center portion is disposed vertically a distance below the seat frame plane more than half the distance in a vertical plane coterminous with the center portion between the seat frame plane and the ground surface plane, and so that the central portion is spaced above the ground surface plane when supporting the full weight of an occupant.

2. The portable lay-down blind of claim 1 further comprising:

a bottom brace having two side bars and a horizontal bottom bar, said side bars having upper ends and lower ends, the upper ends pivotally attached to the lateral support arms of said seat frame between the support arm head ends and support arm toe ends thereof, the bottom bar extending between the lower ends of said side bars, such that said bottom brace is pivotally suspended from said support arms and said bottom bar is disposed between said seat and the support surface.

3. The portable lay-down blind of claim 2 further wherein:

said bottom bar has a transverse length between said side bars less than the distance between the support arms of said seat frame.

4. The portable lay-down blind of claim 1 further comprising:

said covering including a pair of flap doors for closing the top opening to said enclosure.

5. The portable lay-down blind of claim 1 wherein:

said covering includes a camouflage disguise.

6. The portable lay-down blind of claim 1 wherein:

said gurney-style seat forms a bucket-style seat sized for cradling a substantial portion of the torso of a person in a reclining disposition below said head end and toe end edges.

7. The portable lay-down blind of claim 1 wherein:

the center portion of said seat depends below the side edges thereof such that most of the torso of a person cradled therein is disposed below said side edges.

8. The portable lay-down blind of claim 1 wherein:

said support arm head ends attached to the top ends of the vertical struts of said head end frame at a higher elevation than said support arm toe ends.

9. The portable lay-down blind of claim 1 wherein:

the head end edge of said seat is elevated above the toe end edge thereof.

10. The portable lay-down blind of claim 9 wherein:

said seat includes a head rest supported by the top bar of said head-end frame.

11. The portable lay-down blind of claim 1 wherein:

the center portion of said seat is elevated above a support surface on which the blind is resting when an occupant is cradled therein.

12. The portable lay-down blind including a gurney-style seat of claim 1 wherein:

the seat frame plane is coterminous with the lateral support arms of the seat frame.

13. A portable lay-down blind including a gurney-style seat comprising:

a framework for resting on a support surface, said framework having a head end and a toe end, said framework including an elevated seat frame extending from said head end to said toe end, said seat frame including a pair of elevated lateral support arms extending from the head end to the toe end of said framework, a covering supported by said framework, said covering forming an enclosure sized for accommodating an occupant, said covering having a top opening providing access to the enclosure, a gurney-style seat for supporting the occupant in a reclining position in said enclosure, said seat laterally suspended from said seat frame, said seat frame capable of supporting the full weight of said occupant in an elevated position above the support surface, and a bottom brace having two side bars and a horizontal bottom bar extending between said side bars, said side bars having upper ends pivotally attached to the lateral support arms of said seat frame at bottom brace joints between the head and toe ends thereof, such that said bottom brace is pivotally suspended from said support arms and said bottom bar is disposed between said seat and the support surface, said side bars having sufficient flexibility that when downward force is applied to said bottom brace joints, the bottom bar of said bottom brace engages the support surface thereby reinforcing said lateral support arms against the downward force, such that the bottom brace helps support the weight of an occupant pushing down on said lateral support arms.

14. The portable lay-down blind of claim 13 wherein:

said bottom brace is movable from a depending position to a collapsed position, in said depending position said side bars disposed vertically, and in said collapsed position said bottom brace disposed parallel to the lateral support arms of said seat frame.

15. A portable lay-down blind including a gurney-style seat comprising:

a framework for resting on a support surface, said framework including a horizontal base frame, a head-end frame, and an elevated seat frame, said base frame for resting on a support surface, said base frame having two side bars and a crossbar extending between said side bars, each of said side bars having a toe end, said head-end frame having two vertical struts and a top bar extending between said vertical struts, said vertical struts attached to and extending upwardly from the crossbar of said base frame, each of said struts including an upper end, and said seat frame including a pair of elevated lateral support arms and a bottom brace, said support arms each having a head end and a toe end, the head ends of said support arms attached to the upper ends of the struts of said head-end frame and the toe ends of said support arms attached to the toe ends of the side bars of said base frame, such that said support arms slope downwardly from the head ends toward the toe ends thereof, said bottom brace having two side bars and a horizontal bottom bar extending between said side bars, said side bars having upper ends pivotally attached to the lateral support arms of said seat frame between the head and toe ends thereof, such that said bottom brace is pivotally suspended from said support arms and said bottom bar is disposed between said seat and the support surface, said bottom brace movable from a depending position to a collapsed position, in said depending position said side bars disposed vertically, and in said collapsed position said bottom brace disposed parallel to the lateral support arms of said seat frame, said side bars having sufficient flexibility that when downward force is applied thereto, the bottom bar of said bottom brace when in said collapsed position engages the support surface thereby reinforcing said lateral support arms against the downward force, such that the bottom brace helps support the weight of an occupant pushing down on said lateral support arms, a covering supported by said framework, said covering forming an enclosure sized for accommodating an occupant, said covering having a top opening providing access to the enclosure, and a gurney-style seat for supporting the occupant in a reclining position in said enclosure, said seat frame includes a pair of elevated lateral support arms extending from the head end to the toe end of said framework, said seat suspended from said lateral supports, said seat frame capable of supporting the full weight of an occupant of said seat in an elevated position above the support surface.

16. A portable lay-down blind including a gurney-style seat comprising:

a framework having a head end frame, an elevated seat frame, and a head end and two side base bars, said head end and side base bars for resting on a support surface, said head end frame having two vertical struts extending upwardly from the head end base bar, each strut having a top end, said seat frame having a pair of vertical risers, a toe end crossbar extending therebetween for resting on a support surface, and a pair of elevated lateral support arms each having a support arm head end and a support arm toe end, the support arm head ends attached to the top ends of the vertical struts of said head end frame, the support arm toe ends attached to said vertical risers, and each of said side base bars having a side bar head end, the head end base bar extending between said side bar head ends, a ground surface plane coterminous with the head end base bar and the toe end cross bar, the support arm head ends and the support arm toe ends spaced from the ground surface plane, the support arm head ends spaced from the ground surface plane more than the support arm toe ends, a seat frame plane coterminous with the lateral support arms of the seat frame, and a gurney-style seat configured to support a person in a reclining disposition and sized to provide support surfaces for the torso and legs of such person, a gurney-style seat having side edges, a head end edge, a toe end edge, and a center portion between said head end, toe end and side edges, the seat suspended by said side edges from the lateral support arms of said seat frame, the seat also configured so that the center portion is disposed vertically a distance below the seat frame plane more than half the distance in a vertical plane coterminous with the center portion between the seat frame plane and the ground surface plane, and so that the central portion is spaced above the ground surface plane when supporting an occupant.

17. A portable lay-down blind including a gurney-style seat comprising:

a framework having a base frame, a head end frame, and an elevated seat frame, said base frame having two side bars and a head end base bar, each of said side bars having a side bar toe end and a side bar head end, said head end base bar extending between said side bar head ends, said side bars and said head end base bar for resting on a support surface, said head end frame having two vertical struts and a top bar, each of said struts extending upwardly from said head end base bar and having a top end, said top bar extending between said top ends, said seat frame having a pair of vertical risers, a toe end crossbar and a pair of elevated lateral support arms, said toe end crossbar extending between said vertical risers for resting on a support surface, said vertical risers attached to the side bar toe ends of said base frame, said pair of elevated lateral support arms each having a support arm toe end and a support arm head end, the support arm toe ends attached to said vertical risers, the support arm head ends attached to the top ends of the vertical struts of said head end frame, a ground surface plane coterminous with the head end base bar and side bars of said base frame and with the toe end cross bar of the seat frame, the support arm head ends and the support arm toe ends spaced from the ground surface plane, the support arm head ends spaced from the ground surface plane more than the support arm toe ends, a seat frame plane coterminous with the lateral support arms of the seat frame, the seat frame plane disposed at an angle to the ground surface plane, and a gurney-style seat configured to support a person in a reclining disposition and sized to provide support surfaces for the torso and legs of such person, a gurney-style seat having side edges, a head end edge, a toe end edge, and a center portion between said head end, toe end, and side edges, the seat suspended by said side edges from the lateral support arms of said seat frame, the head end edge spaced from the ground surface plane a distance greater than the toe end edge is spaced therefrom, the seat also configured so that the center portion is disposed vertically a distance below the seat frame plane more than half the distance in a vertical plane coterminous with the center portion between the seat frame plane and the ground surface plane, and so that the central portion is spaced above the ground surface plane when supporting an occupant.

18. The portable lay-down blind of claim 17 wherein:
the lateral support arms of said seat frame extend linearly from said support arm head ends to said support arm toe ends.

19. The portable lay-down blind of claim 17 wherein:
the upper end of said gurney-style seat includes an upper sleeve, and
the top bar of the head-end frame includes two raised shoulders between which extend an interconnecting segment that is received in the upper sleeve,
whereby the gurney-style seat is suspended from said head end cross bar.

\* \* \* \* \*